United States Patent

[15] 3,688,115

Antkiw

[45] Aug. 29, 1972

[54] BOREHOLE FLUID DENSITY LOGGING TOOL WITH NON-TURBULENT MEASURING CHAMBER FLOW

[72] Inventor: Stephen Antkiw, Ridgefield, Conn.

[73] Assignee: Schlumberger Technology Corporation

[22] Filed: June 8, 1970

[21] Appl. No.: 44,393

[52] U.S. Cl. ...250/71.5 R, 250/43.5 D, 250/43.5 FC
[51] Int. Cl. ..............................................G01t 1/20
[58] Field of Search.......250/43.5 D, 43.5 FC, 106 L; 356/208; 137/801

[56] References Cited

UNITED STATES PATENTS

| | | | |
|---|---|---|---|
| 3,334,226 | 8/1967 | Buck | 250/43.5 D |
| 2,965,753 | 12/1960 | Reynolds et al. | 250/43.5 FC |
| 2,952,776 | 9/1960 | Schumacher et al. | 250/43.5 D X |
| 3,529,153 | 9/1970 | Zimmerman et al. | 250/43.5 D |
| 3,070,692 | 12/1962 | Ohmart et al. | 250/43.5 D |

Primary Examiner—James W. Lawrence
Assistant Examiner—Davis L. Willis
Attorney—William R. Sherman, Stewart F. Moore, Ernest R. Archambeau, David L. Moseley, Jerry M. Presson, Edward M. Roney, Michael J. Berger and James C. Kesterson

[57] ABSTRACT

A specific embodiment of the invention provides an improved fluid density measuring device for use in producing oil wells. Density is determined by forcing the well fluid to pass through a chamber in the device. The fluid attenuates a beam of gamma radiation that traverses the chamber, the relative changes in the beam intensity providing a measure of the density in question. Streamline surfaces and passageways leading into and out of the chamber eliminate turbulent flow conditions within the measuring chamber and thereby establish the basis for a substantially more accurate log of the production fluid density.

6 Claims, 1 Drawing Figure

PATENTED AUG 29 1972
3,688,115
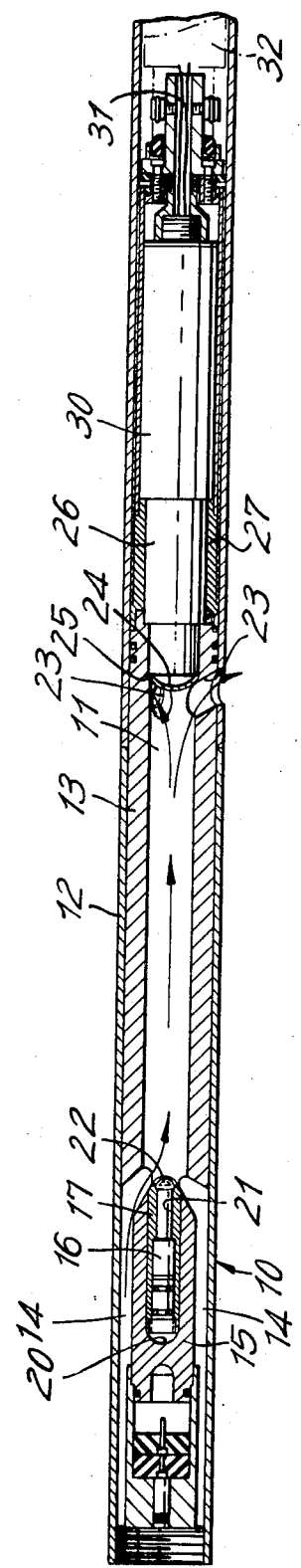
INVENTOR
STEPHEN ANTKIW
BY John P. Sinnott
ATTORNEY

BOREHOLE FLUID DENSITY LOGGING TOOL WITH NON-TURBULENT MEASURING CHAMBER FLOW

BACKGROUND OF THE INVENTION

1. Field of the Invention

This invention relates to measuring equipment and more specifically, to a radioactive oil well production fluid density meter, and the like.

2. Description of the Prior Art

As oil well drilling costs increase, and as the world's known oil reserves are depleted, the need to optimize production from existing wells assumes increasing importance. Consequently, techniques have been developed to analyze the production characteristics of these wells.

For example, tools have been suggested to measure production fluid density through the attenuation of a beam of gamma rays that are emitted from a source which is spaced a specific distance from a gamma ray detector. These tools usually are lowered into a borehole to a predetermined depth in order to measure the fluid density while the well is being produced. The tool volume between the source and the detector provides a measuring chamber through which the borehole liquid flows. Most of the gamma rays that traverse the measuring chamber are registered in the detector which generates a response, or output signal, that is compared with data drawn from tests in other fluids of known densities to indicate the density of the fluid under irradiation.

Although it has been proposed to provide a fairing for the gamma ray source in order to avoid obstructing flow into the chamber, these suggested devices nevertheless have, on occasion, produced inconsistent results. It can be shown, for example, that the gamma ray attenuation can fluctuate in a way that is not related to changes in the actual fluid density. Accordingly, a need exists to minimize or eliminate the causes of these discrepancies between the observed gamma ray attenuation and the actual fluid density.

SUMMARY OF THE INVENTION

In accordance with the invention, it appears that some of the apparently random departures between the observed detector response and the detector response appropriate to the actual fluid density are attributable to turbulent flow conditions within the measuring chamber. For example, turbulent or non-laminar flow in the chamber produces bubbles, cavitation, eddies and stagnation points. These hydraulic phenomena lead to radical shifts in the apparent fluid density that are generally unrelated to the true fluid density under standard measurement conditions. These flow-related density changes are reflected in the gamma ray attenuation and thus produce a misleading detector signal.

The presence of these conditions in a practical flow measuring situation is virtually unpredictable because it depends on a broad range of unknown and variable factors, of which the fluid viscosity and the local flow velocity are typical. Because of this unpredictable behavior, and the impossibility of observing measuring chamber flow in actual borehole conditions, the oil industry heretofore has failed to recognize the influence of turbulence on production fluid density measurements.

Recognition of the important effect that turbulent flow imposes on production measurements is a characteristic feature of the invention. This observation manifests itself physically or structurally in the development of a hydrodynamically "clean" measuring chamber with streamline inlets and outlets in order to promote laminar or non-turbulent flow through a broad range of well fluid production conditions. In this manner, the swirling currents, bubbles and the like that led to incorrect fluid density measurements in the past, now are minimized through the structural innovations of the present invention.

More particularly, a typical production density tool embodying principles of the invention, is equipped with a cesium 137 ($Cs^{137}$) source of gamma rays mounted in a fairing that is spaced about 10 inches from the opposing surface of a gamma radiation sensitive scintillation crystal. The flow or measuring chamber between the source and crystal is defined by a tubular tungsten sleeve about 8 inches long and three-fourths of an inch inside diameter.

A steel pressure window to protect the crystal from the fluids in the chamber is provided with a spherical surface that tends to eliminate fluid turbulence or stagnation immediately in front of the crystal. The spherical pressure window surface and adjacent measuring chamber discharge ports further combine to produce a nozzle that enhances laminar discharge and prevents the flow separation with attendant turbulence that was inherent in the outlet diffusers suggested in the prior art.

In a similar manner, the inlet ports formed around the $Cs^{137}$ gamma ray source fairing have axes that make acute angles with the measuring chamber centerline, in order to provide nozzles that generally promote laminar flow conditions.

The window, moreover, is spaced from the crystal surface by about one inch to prevent that portion of the gamma radiation which is scattered by the window and analyzer body from being registered in the crystal. This specific feature serves to reduce a further cause of density signal degradation. The gamma radiation source also is collimated to minimize for this same purpose and to reduce analyzer back scattering effects or the influence of external gamma radiation.

For a better understanding of the present invention together with other and further objects thereof, reference is had to the following description taken in connection with the accompanying drawing, the scope of the invention being pointed out in the appended claims.

DESCRIPTION OF THE DRAWING

The sole FIGURE of the drawing shows a plan view in full section of a production density logging tool that illustrates the principles of the invention.

DESCRIPTION OF THE PREFERRED EMBODIMENTS

For a more complete appreciation of the invention, the sole FIGURE of the drawing shows an oil well fluid production density device 10 that reflects borehole fluid density in response to gamma ray attenuation in a measuring chamber 11. Typically, the measuring chamber is about eight inches long by three-quarters of an inch in diameter. The chamber 11 is formed by an outer housing 12 of stainless steel or the like, and an analyzer body or sleeve of tungsten 13 that is snugly received within the tool housing 12.

Inlet passageways 14 are formed between the inner wall of the housing 12 and a gamma ray source fairing or holder 15. Illustratively, the gamma ray source holder comprises a $Cs^{137}$ gamma ray source 16 that has an activity of 3 millicuries. The source 16 is received in a steel insert 17 that is secured in a recess 20, formed on the longitudinal axis of the fairing 15. The fairing 15 and the steel insert, which is conveniently secured within the tool housing 12 through screws or the like, has a bore or collimator 21 which focusses the gamma radiation emitted from the source 16 toward the measuring chamber 11. The collimator 21 moreover, is sealed with a stainless steel pressure tight window 22 to prevent well fluids from coming into contact with the source 16.

In accordance with a feature of the invention, it should be noted that the passageways 14, formed by the source fairing 15 and the inner surface of the tool housing 12, provide inlet nozzles for the measuring chamber 11. For the purpose of the invention, the nozzle configuration is defined in the usual technical sense, as a channel wherein the velocity of the fluid is increased and the pressure reduced. Nozzle conditions of this sort tend to prevent the onset of fluid separation or turbulent mixing that ordinarily occur in the diffuser inlets of the prior art. Consequently, through the use of inlet nozzles in a production density tool, a streamline, laminar flow is maintained into the measuring chamber 11.

The configuration of discharge nozzles 23 are combined with the smooth, spherical surface formed in a stainless steel end member or pressure window 24 at the downstream end of the measuring chamber 11 to enhance smooth flow within the measuring chamber 11. The spherical section characterizing the end member 24 contributes a further advantage in that it eliminates one or more fluid stagnation points in the measuring chamber immediately in front of the member.

The end member is secured to a flange 25 that is formed in the tungsten sleeve 13 by welding or brazing, for example. A scintillation crystal 26 is spaced in a direction away from the gamma radiation source 16 in a fluid tight cavity that is about an inch downstream from the end member 24. The crystal 26 detects the gamma radiation emitted from the source after it has traversed the measuring chamber 11. This novel setback between the member 24 and the crystal 26 prevents much of the gamma radiation that is scattered by the member from registering in the crystal. This configuration prevents, to a large extent, gamma radiation that is scattered by the end member from degrading the quality of the detector signal.

Preferably, a crystal about one and one-half inches long by one inch in diameter is enclosed in a hollow cylindrical tungsten sleeve 27 that is nested within the outer tool housing 12. The crystal 26 responds to incident gamma radiation by producing brief flashes of light that are generally proportional in intensity to the gamma ray energy dissipated within the crystal. A photomultiplier tube 30, optically coupled to the end of the crystal 26 that is in a downstream direction from the end member 24, responds to these light flashes by producing an amplified electrical charge pulse that is related to the intensity of the light flash. These signals are sent through conductors 31 to a downhole signal processing circuit 32 that conditions the signals for transmission to the earth's surface through an armored cable (not shown) for further processing and interpretation on the earth's surface in terms of the production fluid density.

I claim:

1. A density logging tool for use in a borehole through which fluids are flowing, comprising a source of gamma radiation, a gamma radiation detector spaced from said source, nozzle means for promoting non-turbulent flow conditions past said source, and further nozzle means spaced from said source for promoting non-turbulent flow conditions in the space between said source and said detector 2. A tool according to claim 1, further comprising an end member having a surface of revolution formed thereon and adjacent to said spaced nozzle means for enhancing non-turbulent fluid discharge from said nozzle means.

3. A tool according to claim 2 wherein said gamma ray detection means is spaced from said end member means in a direction that is away from said gamma radiation source.

4. A gamma ray density production logging tool comprising a housing, a tungsten liner within said housing having a passage therethrough, a gamma radiation source in said housing and adjacent to one end of said tungsten lined passage, nozzle means formed between said gamma radiation source and said housing and said tungsten liner for establishing laminar flow conditions into said passage and further nozzle means formed in the opposite end of said tungsten lined passage, said further nozzle means establishing laminar flow conditions for fluid discharge therefrom, and a radiation detection means located proximate to said further nozzle means.

5. A tool according to claim 4, further comprising an end member adjacent to and forming a part of said further nozzle means and having a surface of revolution formed thereon in order to establish streamline flow conditions from said passage and into said further nozzle means.

6. A tool according to claim 5 wherein said radiation detection means comprises a scintillation crystal spaced from said end member in a direction away from said gamma ray source.

* * * * *